(12) United States Patent
Yonekura et al.

(10) Patent No.: US 12,623,187 B2
(45) Date of Patent: May 12, 2026

(54) EXHAUST GAS TREATMENT FACILITY

(71) Applicant: IHI Corporation, Koto-ku (JP)

(72) Inventors: Kazuo Yonekura, Tokyo (JP);
Takafumi Nishizu, Tokyo (JP);
Yasufumi Mochizuki, Tokyo (JP);
Hiroki Saitou, Tokyo (JP)

(73) Assignee: IHI Corporation, Koto-ku (JP)

( * ) Notice: Subject to any disclaimer, the term of this patent is extended or adjusted under 35 U.S.C. 154(b) by 1036 days.

(21) Appl. No.: 17/625,174

(22) PCT Filed: Jul. 15, 2020

(86) PCT No.: PCT/JP2020/027449
§ 371 (c)(1),
(2) Date: Jan. 6, 2022

(87) PCT Pub. No.: WO2021/010411
PCT Pub. Date: Jan. 21, 2021

(65) Prior Publication Data
US 2022/0258101 A1 Aug. 18, 2022

(30) Foreign Application Priority Data

Jul. 16, 2019 (JP) ................................ 2019-130924

(51) Int. Cl.
B01D 53/86 (2006.01)
F22B 37/00 (2006.01)
(Continued)

(52) U.S. Cl.
CPC ..... B01D 53/8696 (2013.01); B01D 53/8631 (2013.01); F22B 37/00 (2013.01);
(Continued)

(58) Field of Classification Search
CPC ........ B01D 53/00; B01D 53/34; B01D 53/74; B01D 53/86; B01D 53/8621;
(Continued)

(56) References Cited

U.S. PATENT DOCUMENTS

| | | | |
|---|---|---|---|
| 8,716,169 B2 * | 5/2014 | Gadgil | B01D 53/8696 |
| | | | 44/620 |
| 2013/0030573 A1 * | 1/2013 | Mercangoez | F23K 1/00 |
| | | | 700/275 |
| 2016/0177183 A1 * | 6/2016 | Atarashiya | C10B 21/18 |
| | | | 202/109 |

FOREIGN PATENT DOCUMENTS

| | | |
|---|---|---|
| JP | 6-277447 A | 10/1994 |
| JP | 2009-228918 A | 10/2009 |

(Continued)

OTHER PUBLICATIONS

KR 20190074456 A with a machine translation (Year: 2019).*
CN 104826493 A with a machine translation (Year: 2015).*

*Primary Examiner* — Natasha E Young
(74) *Attorney, Agent, or Firm* — Oblon, McClelland, Maier & Neustadt, L.L.P.

(57) ABSTRACT

A control system, for controlling an injection amount of a reducing agent injected into exhaust gas flowing from a coal-fired boiler in a thermal power generation facility toward a denitrification reactor of a denitrification device, includes: a first predictor predicting a first concentration of nitrogen oxides in the exhaust gas flowing toward the denitrification reactor based on first operation data of the thermal power generation facility; and a control device controlling the injection amount based on a predicted value of the first concentration. The first operation data includes at least either one of second operation data and third operation data, the second operation data being operation data of one or more coal pulverizers provided in the thermal power (Continued)

generation facility, and the third operation data being operation data of the coal-fired boiler affected by variation in operation conditions of the one or more coal pulverizers.

6 Claims, 6 Drawing Sheets

(51) Int. Cl.
  *F23J 15/00* (2006.01)
  *G05B 19/4155* (2006.01)
(52) U.S. Cl.
  CPC ........ *F23J 15/003* (2013.01); *G05B 19/4155* (2013.01); *F23J 2215/101* (2013.01); *G05B 2219/42058* (2013.01)
(58) Field of Classification Search
  CPC ............ B01D 53/8625; B01D 53/8631; B01D 53/8696; B01D 2251/00; B01D 2251/20; B01D 2251/206; B01D 2251/2062; B01D 2258/00; B01D 2258/02; B01D 2258/0283; F22B 37/00; F23J 15/00; F23J 15/003; F23J 2215/00; F23J 2215/10; F23J 2215/101; G05B 19/00; G05B 19/02; G05B 19/18; G05B 19/4155; G05B 2219/00; G05B 2219/30; G05B 2219/42; G05B 2219/42058
  See application file for complete search history.

(56) References Cited

FOREIGN PATENT DOCUMENTS

| | | | |
|---|---|---|---|
| JP | 203549804 | U | 4/2014 |
| JP | 2014-211249 | A | 11/2014 |
| JP | 2018-105592 | A | 7/2018 |

* cited by examiner

EXHAUST GAS TREATMENT FACILITY

The present application is a U.S. National Stage entry of International Application No. PCT/JP2020/027449, now WO 2021/010411, filed on Jul. 15, 2020. Priority is also claimed to Japanese Patent Application No. 2019-130924, filed on Jul. 16, 2019, the content of which is incorporated herein by reference.

TECHNICAL FIELD

The present disclosure relates to control systems.

BACKGROUND

Patent Document 1 below discloses a denitrification device that removes nitrogen oxides (NOx) in exhaust gas discharged from a boiler in a thermal power plant. The denitrification device introduces exhaust gas into a reactor including a catalyst and decomposes the nitrogen oxides in the exhaust gas into harmless nitrogen ($N_2$) and water ($H_2O$) by the action of the catalyst using a reducing agent (for example, ammonia ($NH_3$)).

DOCUMENT OF RELATED ART

Patent Document

[Patent Document 1] Japanese Unexamined Patent Application, First Publication No. 2014-211249

SUMMARY

Technical Problem

The flow rate of exhaust gas discharged from a boiler is not always constant and may vary greatly. Therefore, the operator of a thermal power plant sometimes sets the amount of the reducing agent to be injected into the exhaust gas (hereinafter referred to as "injection amount") to a higher value such that the concentration of NOx emitted from the thermal power plant does not exceed the regulation value. Therefore, an excessive amount of reducing agent may be injected into the exhaust gas, and it is desirable to appropriately control the injection amount of the reducing agent even when the flow rate of the exhaust gas varies.

The present disclosure has been made in view of such circumstances, and an object thereof is to provide a control system capable of appropriately controlling the injection amount of a reducing agent even when the flow rate of exhaust gas varies.

Solution to Problem

A control system of a first aspect of the present disclosure is a control system for controlling an injection amount of a reducing agent to be injected into exhaust gas flowing from a coal-fired boiler in a thermal power generation facility toward a denitrification reactor of a denitrification device, the control system including: a first predictor predicting a first concentration, which is a concentration of nitrogen oxides in the exhaust gas flowing toward the denitrification reactor, based on first operation data which is operation data of the thermal power generation facility; and a control device controlling the injection amount based on a predicted value of the first concentration predicted by the first predictor, wherein the first operation data includes at least either one of second operation data and third operation data, the second operation data being operation data of one or more coal pulverizers provided in the thermal power generation facility, and the third operation data being operation data of the coal-fired boiler affected by variation in operation conditions of the one or more coal pulverizers.

A second aspect of the present disclosure is the control system of the first aspect, in which the thermal power generation facility includes a plurality of the coal pulverizers, and the second operation data includes data indicating operation conditions of each of the plurality of the coal pulverizers.

A third aspect of the present disclosure is the control system of the second aspect, in which the second operation data further includes supply amounts of coal supplied to the plurality of coal pulverizers and coal types of the coal supplied to the plurality of coal pulverizers.

A fourth aspect of the present disclosure is the control system of any one of the first to third aspects, in which the control system further includes: a first learner constructing a prediction model that outputs the predicted value of the first concentration, by performing machine learning using, as learning data, a data set of the first operation data and measured values of the first concentration obtained in past operations, wherein the first predictor inputs data including the first operation data at a predetermined time point to the prediction model constructed by the first learner and predicts the first concentration after a predetermined period of time has elapsed from the predetermined time point.

A fifth aspect of the present disclosure is the control system of any one of the first to fourth aspects, in which the control device includes: a first calculator calculating a first needed flow rate which is a flow rate of the reducing agent needed to denitrify the nitrogen oxides such that a concentration of the nitrogen oxides is a target value or lower when the nitrogen oxides with the first concentration predicted by the first predictor are introduced into the denitrification device; and a controller controlling the injection amount based on the first needed flow rate calculated by the first calculator.

A sixth aspect of the present disclosure is the control system of any one of the first to fourth aspects, in which the control system further includes: a second predictor predicting a second concentration, which is a concentration of nitrogen oxides in the exhaust gas having passed through the denitrification reactor, based on fourth operation data related to a denitrification reaction in the denitrification reactor, wherein the control device includes: a first calculator calculating a first needed flow rate which is a flow rate of the reducing agent needed to denitrify the nitrogen oxides such that a concentration of the nitrogen oxides is a target value or lower when the nitrogen oxides with the first concentration predicted by the first predictor are introduced into the denitrification device; a subtractor calculating a difference value between a predicted value of the second concentration and the target value; a second calculator calculating a second needed flow rate which is a flow rate of the reducing agent needed for the denitrification device to denitrify all of the nitrogen oxides of the difference value calculated by the subtractor; an adder calculating a third needed flow rate by adding the first needed flow rate and the second needed flow rate; and a controller controlling the injection amount based on the third needed flow rate calculated by the adder.

A seventh aspect of the present disclosure is the control system of the sixth aspect, in which the control system further includes: a second learner constructing a second prediction model that outputs a predicted value of the second concentration, by performing machine learning using, as learning data, a data set of the fourth operation data and measured values of the second concentration obtained in past operations, wherein the second predictor inputs data including the fourth operation data at a predetermined time point to the second prediction model constructed by the second learner and predicts the second concentration after a predetermined period of time has elapsed from the predetermined time point.

Effects

As described above, according to the present disclosure, the injection amount of the reducing agent can be appropriately controlled even when the flow rate of the exhaust gas varies.

DESCRIPTION OF EMBODIMENTS

Hereinafter, a control system according to the present embodiment will be described with reference to the drawings.

Figure 1:
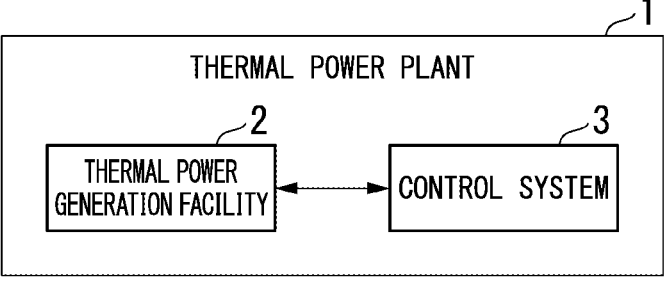
FIG. 1 is a diagram illustrating an example of a schematic configuration of a thermal power plant 1 including a control system according to a first embodiment.

FIG. 1 is a diagram illustrating an example of a schematic configuration of a thermal power plant 1 including the control system according to the first embodiment.

The thermal power plant 1 includes a thermal power generation facility 2 and a control system 3.

The thermal power generation facility 2 supplies steam to a steam turbine (not illustrated) and rotates the steam turbine, the steam being generated by heating a fluid flowing through a heat transfer pipe or the like installed inside a coal-fired boiler 5 by burning fuel in the coal-fired boiler 5. Then, the thermal power generation facility 2 drives an electric power generator (not illustrated) by the rotation of the steam turbine to obtain generated electric power.

The control system 3 controls an injection amount F of a reducing agent to be injected into the exhaust gas flowing from the coal-fired boiler 5 in the thermal power generation facility 2 toward a denitrification catalyst in a denitrification device 31.

Figure 2:
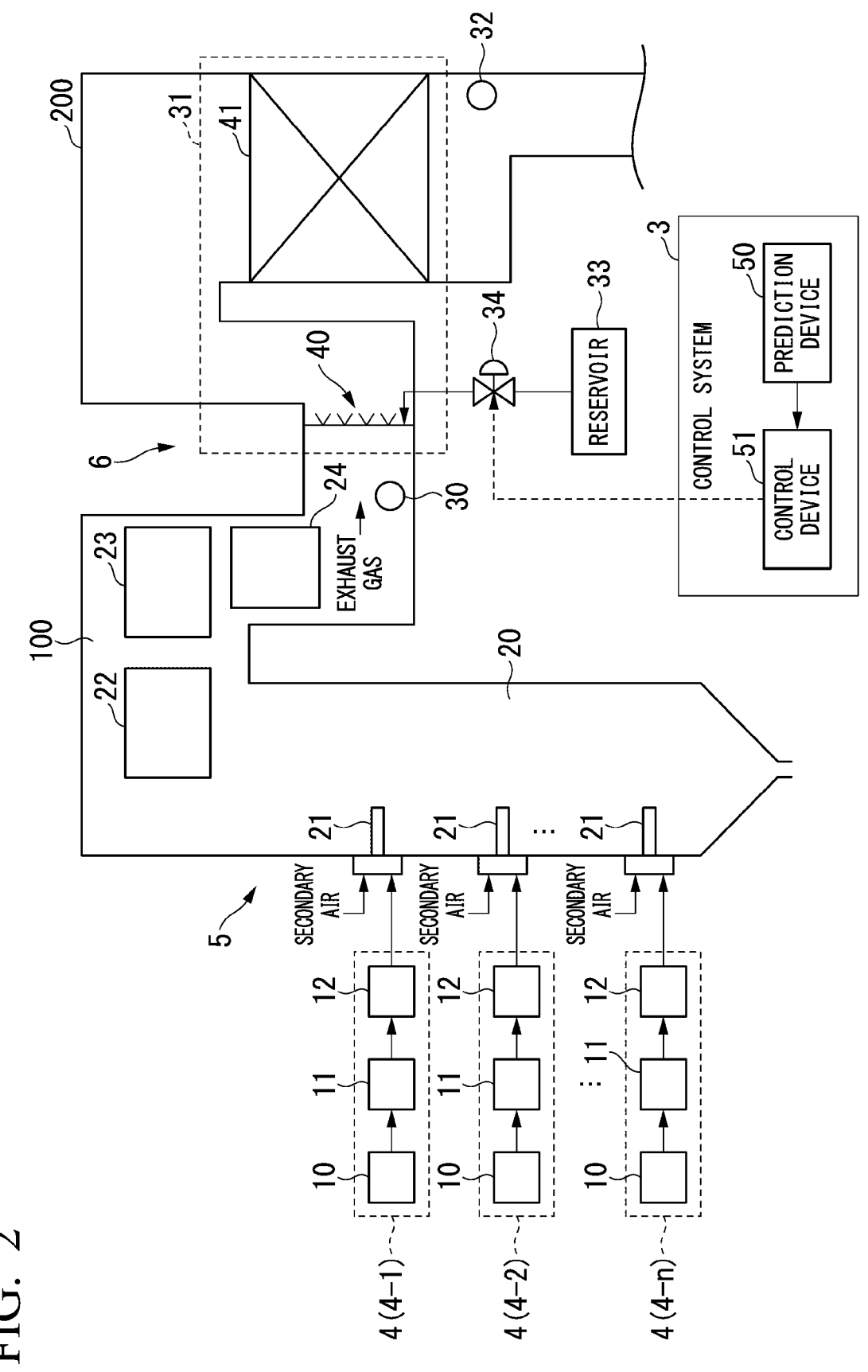
FIG. 2 is a schematic configuration diagram of a thermal power generation facility 2 and a control system 3 according to the first embodiment.

Hereinafter, a schematic configuration of the thermal power generation facility 2 according to the first embodiment will be described with reference to FIG. 2. FIG. 2 is a schematic configuration diagram of the thermal power generation facility 2 and the control system 3 according to the first embodiment.

As illustrated in FIG. 2, the thermal power generation facility 2 includes a plurality of pulverized coal supply devices 4 (pulverized coal supply devices 4-1 to 4-n (n is an integral number of two or more)), a coal-fired boiler 5, and an exhaust gas treatment facility 6. However, the thermal power generation facility 2 may be provided with only one pulverized coal supply device 4.

The plurality of pulverized coal supply devices 4-1 to 4-n produces pulverized coal from coal and supplies the pulverized coal to the coal-fired boiler 5 as fuel. The pulverized coal supply devices 4-1 to 4-n have the same configuration. However, for the purpose of distinguishing the pulverized coal supply devices from each other, in the following description, "-1" is sometimes added to the end of the reference symbol of each component of the pulverized coal supply device 4-1, "-2" is sometimes added to the end of the reference symbol of each configuration of the pulverized coal supply device 4-2, and "-n" is sometimes added to the end of the reference symbol of each configuration of the pulverized coal supply device 4-n. When the plurality of pulverized coal supply devices 4-1 to 4-n are not distinguished, each is simply denoted as "pulverized coal supply device 4".

The schematic configuration of the pulverized coal supply device 4 according to the first embodiment will be described below.

The pulverized coal supply device 4 includes a coal bunker 10, a coal feeder 11, and a coal pulverizer 12.

The coal bunker 10 is a tubular container for storing coal. In the first embodiment, the coal bunkers 10 (10-1 to 10-n) of the pulverized coal supply devices 4-1 to 4-n store different types of coal.

The coal feeder 11 supplies the coal stored in the coal bunker 10 to the coal pulverizer 12. For example, the coal feeder 11 supplies a predetermined amount of coal to the coal pulverizer 12 while measuring the amount of the coal supplied from the coal bunker 10. The predetermined amount (hereinafter, referred to as "supply amount") may be determined according to the load of the thermal power generation facility 2. Information on the supply amount of each of the coal feeders 11-1 to 11-n is also transmitted to the control system 3.

The coal pulverizer 12 crushes the coal supplied from the coal feeder 11 to produce pulverized coal. Then, the coal pulverizer 12 conveys the produced pulverized coal to the coal-fired boiler 5 using primary air. Since the primary air is a well-known technology, detailed description thereof will be omitted, but the primary air is the air preheated by heat exchange with exhaust gas using an air preheater (GAH) provided in a following stage of the coal-fired boiler 5. The primary air is supplied to the coal pulverizer 12 by a primary air fan. That is, a primary air fan is provided for each of the coal pulverizers 12-1 to 12-n. Each primary air fan supplies the primary air to the corresponding coal pulverizer 12.

The coal pulverizers 12 have a measurement sensor (hereinafter, referred to as "primary air flow rate sensor") for measuring the flow rate of primary air (hereinafter, referred to as "primary air flow rate"), and information on the primary air flow rates measured by the primary air flow rate sensor is transmitted to the control system 3 using wires or wirelessly.

The coal-fired boiler 5 includes a furnace 20, a plurality of combustion devices 21, a superheater 22, a reheater 23, and a coal economizer 24.

The furnace 20 is a furnace body configured with a furnace wall provided in a vertical and tubular shape and burns fuel to generate combustion heat. In the furnace 20, high-temperature combustion gas (exhaust gas) is generated when fuel is burned by a plurality of combustion devices 21.

The plurality of combustion devices 21 are connected to the plurality of coal pulverizers 12 in one-to-one correspondence. The plurality of combustion devices 21 is installed in the furnace 20 and generates exhaust gas by taking in outside air (combustion air) and fuel and burning the fuel. The combustion device 21 is, for example, a burner.

Specifically, the combustion device 21-1 takes in primary air and pulverized coal from the coal pulverizer 12-1, takes in combustion air (secondary air) from the air preheater, and burns the pulverized coal to generate exhaust gas. The combustion device 21-2 takes in primary air and pulverized coal from the coal pulverizer 12-2, takes in combustion air (secondary air) from the air preheater, and burns the pulverized coal to generate exhaust gas. The combustion device 21-$n$ takes in primary air and pulverized coal from the coal pulverizer 12-$n$, takes in combustion air (secondary air) from the air preheater, and burns the pulverized coal to generate exhaust gas. In addition, the combustion devices 21-1 to 21-$n$ may further take in well-known tertiary air.

The superheater 22 includes a plurality of heat transfer pipes, and is a heat exchanger that generates water vapor by heat exchanging the combustion heat of the exhaust gas with the water in the heat transfer pipes. The superheater 22 is provided in the furnace 20. For example, the superheater 22 includes a primary superheater, a secondary superheater, and a final superheater provided in series. The positions where the primary superheater, the secondary superheater, and the final superheater are arranged are not particularly limited as long as they are in the furnace 20 and in an exhaust gas flow path 100 which is the path through which the exhaust gas circulates. The number of stages of the superheater 22 is not particularly limited.

The reheater 23 includes a plurality of heat transfer pipes, and is a heat exchanger that overheats the steam by heat exchanging the combustion heat of the exhaust gas with the steam in the heat transfer pipes. For example, the reheater 23 includes a primary reheater, a secondary reheater, and a final reheater provided in series. The positions where the primary reheater, the secondary reheater, and the final reheater are arranged are not particularly limited as long as they are in the furnace 20 and in the exhaust gas flow path 100. The number of stages of the reheater 23 is not particularly limited.

The coal economizer 24 includes a plurality of heat transfer pipes, and is a heat exchanger that heat exchanges the combustion heat of the exhaust gas with the water in the heat transfer pipes. The coal economizer 24 heats the water (condensed water) supplied from a condenser (not illustrated) with the combustion heat of the exhaust gas. The condensed water that has been superheated by the coal economizer 24 is supplied to the superheater 22, and the state thereof changes to steam in the superheater 22.

The exhaust gas treatment facility 6 is a facility treating the exhaust gas discharged from the coal-fired boiler 5 toward a chimney (not illustrated) and is provided in a flue 200 connecting the coal-fired boiler 5 and the chimney. The exhaust gas treatment facility 6 includes a first NOx concentration measurer 30, a denitrification device 31, a second NOx concentration measurer 32, a reservoir 33, and a control valve 34.

The first NOx concentration measurer 30 measures the concentration (hereinafter referred to as a "first NOx concentration") of nitrogen oxides (NOx) in the exhaust gas discharged from the coal-fired boiler 5, that is, the exhaust gas that has passed through the coal economizer 24. For example, the first NOx concentration measurer 30 is a NOx sensor. For example, the first NOx concentration measurer 30 is provided between the coal economizer 24 and the denitrification device 31 and measures, as the first NOx concentration, the concentration of NOx in the exhaust gas entering the denitrification device 31. Then, the first NOx concentration measurer 30 transmits the measured values of the first NOx concentration to the control system 3 using wires or wirelessly at regular intervals. The first NOx concentration corresponds to the "first concentration" of the present disclosure.

The denitrification device 31 is supplied with a reducing agent (for example, ammonia ($NH_3$)) stored in the reservoir 33 and removes NOx in the exhaust gas discharged from the coal-fired boiler 5, using the reducing agent.

The denitrification device 31 includes an injector 40 and a denitrification reactor 41.

The injector 40 is provided upstream of the denitrification reactor 41. The injector 40 injects the reducing agent supplied from the reservoir 33 into the exhaust gas passing through upstream of the denitrification reactor 41. For example, the injector 40 includes a plurality of nozzles for injecting the reducing agent into the exhaust gas, and injects the reducing agent into the exhaust gas from the plurality of nozzles. The injection amount F of the reducing agent is controlled by the control system 3. The exhaust gas into which the reducing agent is injected is introduced into the denitrification reactor 41.

The denitrification reactor 41 includes a denitrification catalyst. For example, the denitrification reactor 41 performs denitrification by a selective catalytic reduction (SCR) method that decomposes NOx into nitrogen using ammonia as a reducing agent. However, the denitrification reactor 41 may perform denitrification by a well-known method not limited to the selective catalytic reduction method.

When the exhaust gas into which the reducing agent ammonia ($NH_3$) is injected by the injector 40 passes through the denitrification catalyst, NOx and $NH_3$ react according to the following chemical reaction formula and are decomposed into harmless nitrogen ($N_2$) and water vapor ($H_2O$).

$$4NO + 4NH_3 + O_2 \rightarrow 4N_2 + 6H_2O$$

$$NO + NO_2 + 2NH_3 \rightarrow 2N_2 + 3H_2O$$

The second NOx concentration measurer 32 measures the concentration (hereinafter, referred to as a "second NOx concentration") of NOx in the exhaust gas having passed through the denitrification reactor 41. For example, the second NOx concentration measurer 32 is a NOx sensor. For example, the second NOx concentration measurer 32 is provided downstream of the denitrification device 31 and measures, as the second NOx concentration, the concentration of NOx in the exhaust gas after denitrification by the denitrification device 31. Then, the second NOx concentration measurer 32 transmits the measured values of the second NOx concentration to the control system 3 using wires or wirelessly at regular intervals. The second NOx concentration corresponds to the "second concentration" of the present disclosure.

The reservoir 33 stores ammonia (NH3) as the reducing agent. However, the reducing agent is not limited to ammonia, and may be a reducing agent (for example, urea) other than ammonia as long as NOx can be reduced thereby.

The control valve 34 is provided in the middle of the flow path for supplying the reducing agent from the reservoir 33 to the injector 40, and the valve opening degree of the control valve 34 is controlled by the control system 3. Namely, the flow rate of the reducing agent supplied from the reservoir 33 to the injector 40, that is, the injection amount F of the reducing agent is controlled by the valve opening degree of the control valve 34 controlled by the control system 3.

Next, the configuration of the control system 3 according to the first embodiment will be described.

The control system 3 includes a prediction device 50 and a control device 51.

The prediction device 50 is an information processing device such as a computer. For example, the prediction device 50 may include a microprocessor such as a CPU or an MPU, a microcontroller such as an MCU, a memory such as a Random Access Memory (RAM) or a Read Only Memory (ROM), a storage such as a Hard Disk Drive (HDD) or a Solid State Drive (SSD), and an input/output interface.

The prediction device 50 predicts the concentration (that is, the first NOx concentration) of NOx in the exhaust gas flowing toward the denitrification reactor 41 based on the first operation data which is the operation data of the thermal power generation facility 2. The first operation data is measurement data obtained from various sensors installed in various places of the thermal power generation facility 2 and data (hereinafter referred to as "processing data") obtained by processing the measurement data, and is data that varies before the first NOx concentration varies. Naturally, the first operation data does not include the measured values of the first NOx concentration. The processing data may be, for example, a normalized or standardized value, or may be a maximum value or a minimum value. Further, the processing data may be an integrated value or a filtered value.

Here, the first operation data includes at least either one of the operation data (hereinafter referred to as "second operation data") of one or more coal pulverizers 12 provided in the thermal power generation facility 2 and the operation data (hereinafter, referred to as "third operation data") of the coal-fired boiler 5 affected by the variation of the operation conditions of the one or more coal pulverizers 12. The operation conditions of the coal pulverizer 12 may include at least either one of start-up of the operation of the coal pulverizer 12, stopping of the operation of the coal pulverizer 12 and variation in the operation conditions of the coal pulverizer 12, and may include all of them. These variations in the operation conditions of the coal pulverizers 12 cause variations in the output of the coal pulverizer 12, that is, the flow rate of fuel (pulverized coal) and the flow rate of primary air supplied from the coal pulverizer 12 to the coal-fired boiler 5 and affect the operation data of the coal-fired boiler 5.

In the present embodiment, the thermal power generation facility 2 includes a plurality of coal pulverizers 12-1 to 12-n. Therefore, the second operation data according to the first embodiment is the operation data of the coal pulverizers 12-1 to 12-n. The first operation data may include either the second operation data or the third data, the first operation data may be the second operation data, the first operation data may be the third operation data, and the first operation data may be the second operation data and the third data.

The second operation data is a variable that varies before the measured values of the first NOx concentration vary or a control parameter that is controlled before the measured values are controlled, and is data that results from the process of the previous stage of the coal-fired boiler 5. Specifically, the second operation data is data (hereinafter, referred to as "operation condition data") indicating the operation conditions of the coal pulverizers 12-1 to 12-n. The operation condition data may be data including all of the start-up data, the stopping data, and the output data, or may be data including at least either one of them. The start-up data is data indicating whether or not the coal pulverizer 12 starts. The stopping data is data indicating whether or not the coal pulverizer 12 stops. The output data is data indicating variations in the output of the coal pulverizer 12. For example, the operation condition data may be data of the flow rate of primary air or data of the drive current of the primary air fan. For example, the output data may be measurement data of the flow rate of pulverized coal or the primary air flow rate supplied from the coal pulverizer 12 to the coal-fired boiler 5, or data (hereinafter, referred to as "correlation data") that correlates with the flow rate of the pulverized coal or the primary air flow rate. For example, the correlation data may be data of the drive current of the primary air fan. Further, the correlation data may include information on the supply amounts of coal supplied to the coal pulverizers 12-1 to 12-n and the coal types of the coal supplied to the coal pulverizers 12-1 to 12-n.

The third operation data is a variable that varies before the measured values of the first NOx concentration vary or a control parameter that is controlled before the measured values are controlled, and is the operation data of the coal-fired boiler 5, varying due to the process of the previous stage of the coal-fired boiler 5. For example, the third operation data is the operation data of the coal-fired boiler 5 that varies due to the variation of the second operation data. Here, in this embodiment, the flow rate of the fuel (pulverized coal) and the flow rate of the primary air supplied from the coal pulverizer 12 to the coal-fired boiler 5 are included in the second operation data, but since the fuel and the primary air are supplied to the coal-fired boiler 5, the flow rate thereof may be included in the operation data of the coal-fired boiler 5, that is, the third operation data. For example, the third operation data is data related to the flow rate of pulverized coal and the flow rate of conveying air.

Figure 3:
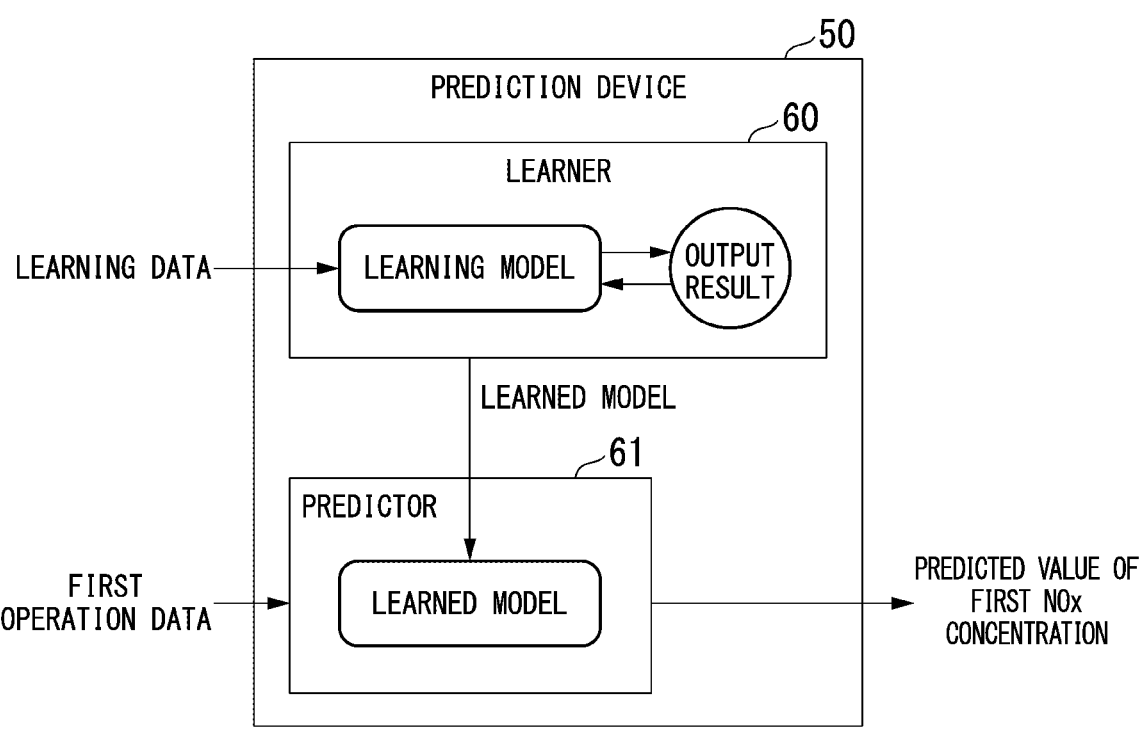
FIG. 3 is a schematic configuration diagram of a prediction device 50 according to the first embodiment.

Hereinafter, the configuration of the prediction device 50 according to the first embodiment will be described with reference to FIG. 3. FIG. 3 is a schematic configuration diagram of the prediction device 50 according to the first embodiment.

As illustrated in FIG. 3, the prediction device 50 includes a learner 60 and a predictor 61. The learner 60 and the predictor 61 may be configured as one integrated device or may be configured as separate components. The learner 60 corresponds to a "first learner" of the present disclosure. The predictor 61 corresponds to a "first predictor" of the present disclosure.

The learner 60 constructs a prediction model (learning model) that predicts the first NOx concentration based on the first operation data, by performing machine learning using, as learning data, the data set of the first operation data and the measured values of the first NOx concentration obtained in past operations. That is, the learner 60 constructs a prediction model by machine-learning, from the learning data, the relationship between the first operation data and the first NOx concentration. Therefore, this prediction model outputs the predicted value of the first NOx concentration when the first operation data is input. As described above, the first operation data is operation data having a correlation or a causal relationship with the first NOx concentration. For example, the prediction model is a so-called neural network.

The learning data includes a data set of the first operation data and the measured values of the first NOx concentration until the elapse of a predetermined period of time $\Delta t$ from a time point when the operation conditions of one or more coal pulverizers 12 changes among the plurality of coal pulverizers 12-1 to 12-$n$. The change in the operation conditions of the coal pulverizer 12 is, for example, when the coal pulverizer 12 is started, when the coal pulverizer 12 is stopped, when the output of the coal pulverizer 12 varies by a predetermined value or more, and the like. The predetermined time $\Delta t$ is a period of time from the change in the operation conditions to the change in the first NOx concentration due to the change in the operation conditions.

The predictor 61 acquires, from the learner 60, the prediction model (learned model) constructed by the learner 60. Then, the predictor 61 predicts the first NOx concentration based on the first operation data which is not the learning data, by the learned model. Specifically, the predictor 61 inputs data including the first operation data at a predetermined time point t1 to the learned model and predicts the first NOx concentration at time point t2 (t2=t1+$\Delta t$) after the predetermined period of time $\Delta t$ has elapsed from the predetermined time point t.

The predictor 61 outputs the predicted value of the predicted first NOx concentration to the control device 51.

The control device 51 is an information processing device such as a computer. For example, the control device 51 may include a microprocessor such as a CPU or an MPU, a microcontroller such as an MCU, a memory such as a Random Access Memory (RAM) or a Read Only Memory (ROM), a storage such as a Hard Disk Drive (HDD) or a Solid State Drive (SSD), and an input/output interface.

The control device 51 controls the injection amount F of ammonia which is a reducing agent by controlling the valve opening degree of the control valve 34 based on the predicted value of the first NOx concentration predicted by the predictor 61.

Figure 4:
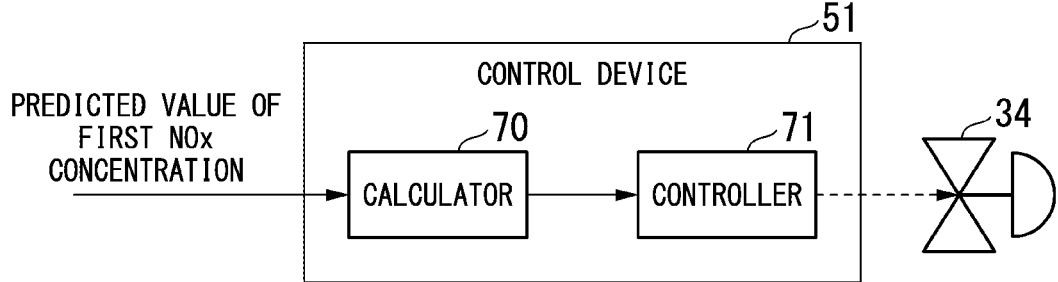
FIG. 4 is a schematic configuration diagram of a control device 51 according to the first embodiment.

The configuration of the control device 51 according to the first embodiment will be described below. FIG. 4 is a schematic configuration diagram of the control device 51 according to the first embodiment.

As illustrated in FIG. 4, the control device 51 includes a calculator 70 and a controller 71.

When NOx having the same concentration as the predicted value of the first NOx concentration predicted by the predictor 61 is introduced into the denitrification device 31, the calculator 70 calculates a flow rate (hereinafter referred to as "needed flow rate") of ammonia (reducing agent) needed for the denitrification device 31 to denitrify NOx such that a concentration thereof is a regulation value Rth or lower. The regulation value Rth is a target value of the second NOx concentration. This regulation value Rth may be stored in advance in a storage (not illustrated) in the control device 51. Further, the control device 51 may receive the regulation value Rth from an external device.

Since the needed flow rate can be calculated using a known method, a specific description thereof will be omitted, but the calculator 70 calculates the total amount of NOx in the exhaust gas based on the flow rate of the exhaust gas at the outlet of the coal economizer 24 and the NOx concentration (predicted value of the first NOx concentration) at the outlet of the coal economizer 24. The flow rate of the exhaust gas at the outlet of the coal economizer 24 may be a predicted value or a measured value. Subsequently, the calculator 70 calculates the molar ratio of the amount of reducing agent to the amount of NOx for satisfying the denitrification rate, based on the NOx concentration at the outlet of the coal economizer 24 when converted to an oxygen concentration of 6% and the set value (the regulation value) of NOx at the outlet of the denitrification device 31. Then, the calculator 70 calculates the needed flow rate of the reducing agent by multiplying the total amount of NOx by the molar ratio.

The controller 71 controls the valve opening degree of the control valve 34 such that the injection amount F of the injector 40 is the needed flow rate of the reducing agent calculated by the calculator 70.

Next, the operation flow of the control system 3 according to the first embodiment will be described.

The prediction device 50 predicts the first NOx concentration at time point t2 (t2=t1+$\Delta t$) after the predetermined period of time $\Delta t$ from the predetermined time point t, by inputting, to the learned model, the data including the first operation data at the predetermined time point t1. The data including the first operation data at the predetermined time point t1 may include the first operation data at the predetermined time point t1, and may further include the first operation data at a time point before the predetermined time point t1. Here, the first operation data includes the second operation data which is the operation data of the coal pulverizers 12-1 to 12-$n$. The second operation data is a variable that varies before the measured values of the first NOx concentration vary or a control parameter that is controlled before the measured values are controlled, and is operation condition data indicating the operation conditions of the coal pulverizers 12-1 to 12-$n$. Therefore, the second operation data includes information enabling which coal pulverizer 12 has started or which coal pulverizer 12 has stopped among the plurality of coal pulverizers 12-1 to 12-$n$ to be understood.

In the normal state where only the coal pulverizer 12-1 is stopped among the plurality of coal pulverizers 12-1 to 12-$n$, when the coal pulverizer 12-1 is started, the amount of exhaust gas increases, and the first NOx concentration increases after a predetermined period of time $\Delta t$. That is, the start-up and stopping of the coal pulverizer 12 is a factor that greatly varies the flow rate of the exhaust gas, in other words, a factor that greatly varies the first NOx concentration. Therefore, the prediction device 50 constructs a prediction model by machine-learning the relationship between the measured values of the second operation data and the measured values of the first NOx concentration. The prediction device 50 predicts the first NOx concentration at time point t2 after a predetermined time has elapsed, using the constructed prediction model. As a result, the prediction device 50 can accurately predict the first NOx concentration even when the flow rate of the exhaust gas varies greatly.

The prediction device 50 outputs the predicted value of the first NOx concentration at time point t2 (t2=t1+$\Delta t$) to the control device 51 (step S102).

The control device 51 calculates the needed flow rate of the reducing agent at time point t2 based on the predicted value of the first NOx concentration at time point t2, and controls the valve opening degree of the control valve 34 such that the injection amount F of the injector 40 is the needed flow rate.

As described above, the control system 3 according to the first embodiment predicts the first NOx concentration based on at least either one of the second operation data which is the operation data of one or more coal pulverizers 12 provided in the thermal power generation facility 2 and the third operation data which is the operation data of the coal-fired boiler affected by the variation in the operation conditions of one or more coal pulverizers. The control system 3 according to the first embodiment controls the injection amount F of the reducing agent based on the predicted value.

With such a configuration, the control system 3 can predict the first NOx concentration in consideration of the operation conditions of the coal pulverizer 12, which is a factor that varies the flow rate of the exhaust gas, and can appropriately control the injection amount F of the reducing agent.

Further, the control system 3 may construct the prediction model by machine-learning the relationship between the measured values of the first operation data, which includes at least either one of the measured values of the second operation data and the third operation data, and the measured values of the first NOx concentration. The control system 3 may predict the first NOx concentration at time point t2 after a predetermined period of time has elapsed using the constructed prediction model.

With such a configuration, the control system 3 can more accurately predict the first NOx concentration in consideration of the operation conditions of the coal pulverizer 12, which is a factor that varies the flow rate of the exhaust gas.

Second Embodiment

Figure 5:
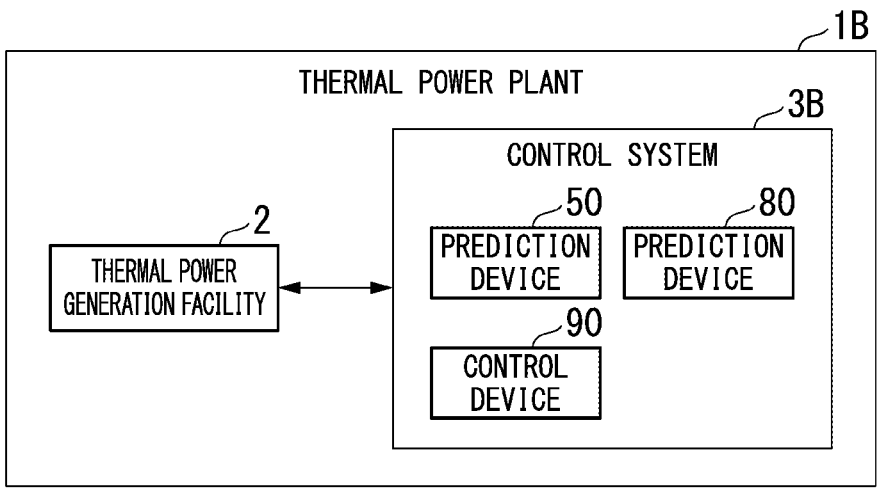
FIG. 5 is a schematic configuration diagram of a thermal power plant 1B including a control system 3B according to a second embodiment.

Next, a control system 3B according to the second embodiment will be described. FIG. 5 is a schematic configuration diagram of a thermal power plant 1B including the control system 3B according to the second embodiment. The thermal power plant 1B according to the second embodiment is different from the first embodiment in that the configuration of the control system B is different, and other configurations thereof are the same as those of the first embodiment. In the drawings, the same or similar portions may be denoted by the same reference symbols and duplicate explanations may be omitted.

The thermal power plant 1B includes a thermal power generation facility 2 and the control system 3B.

The control system 3B controls the injection amount F of the reducing agent to be injected into the exhaust gas flowing from the coal-fired boiler 5 in the thermal power generation facility 2 toward a denitrification catalyst in a denitrification device 31.

Hereinafter, the configuration of the control system 3B according to the second embodiment will be described.

The control system 3B includes a prediction device 50, a prediction device 80, and a control device 90. The prediction device 50 and the prediction device 80 may be configured as one integrated information processing device, or may be configured as separate devices.

The prediction device 80 is an information processing device such as a computer. For example, the prediction device 80 may include a microprocessor such as a CPU or an MPU, a microcontroller such as an MCU, a memory such as a Random Access Memory (RAM) or a Read Only Memory (ROM), a storage such as a Hard Disk Drive (HDD) or a Solid State Drive (SSD), and an input/output interface.

The prediction device 80 predicts the concentration of NOx in the exhaust gas after passing through the denitrification reactor 41, that is, the second NOx concentration, based on fourth operation data including the data related to the denitrification reaction in the denitrification device 31. The fourth operation data may include measurement data obtained from various sensors installed at various locations in the power generation facility 2 and processing data of the measurement data. For example, the fourth operation data may include at least either one of the measured values of the temperature in the denitrification reactor 41, the measured values of the concentration of the reducing agent, the injection amount F, and the measured values of the first NOx concentration, and may include all of them. Further, the fourth operation data may further include characteristic data of the denitrification catalyst. However, the fourth operation data may not include the second operation data and the third operation data.

Figure 6:
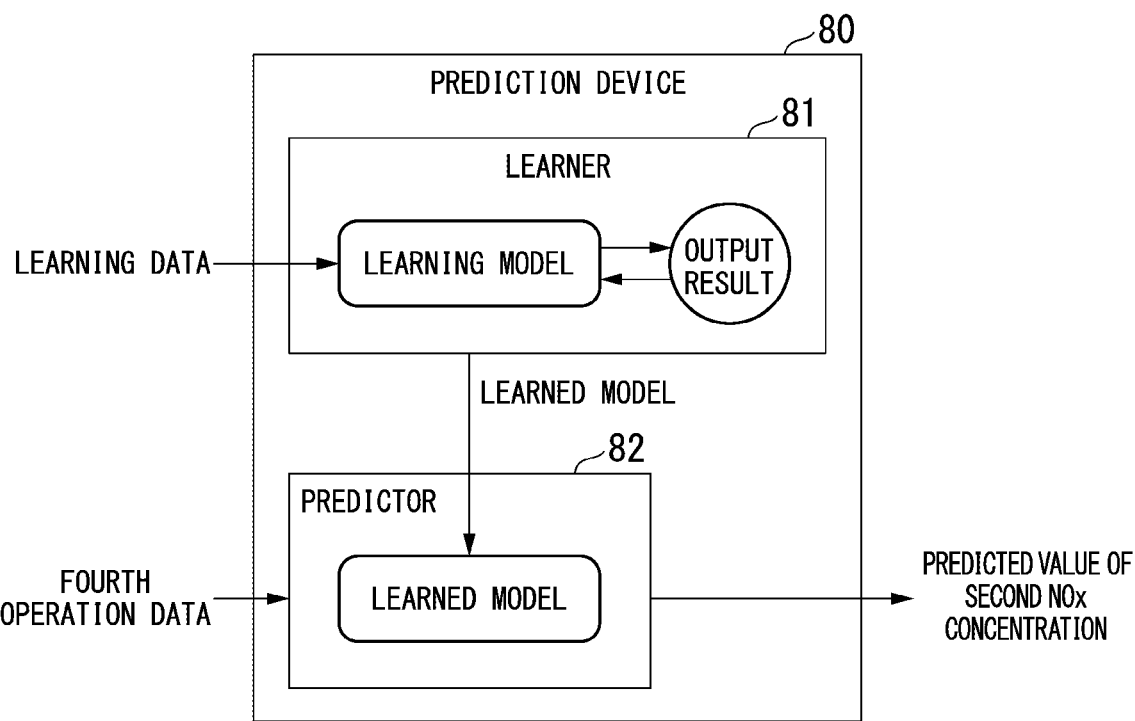
FIG. 6 is a schematic configuration diagram of a prediction device 80 according to the second embodiment.

Hereinafter, the configuration of the prediction device 80 according to the second embodiment will be described with reference to FIG. 6. FIG. 6 is a schematic configuration diagram of the prediction device 80 according to the second embodiment.

As illustrated in FIG. 6, the prediction device 80 includes a learner 81 and a predictor 82. The learner 81 and the predictor 82 may be configured as one integrated device, or may be configured as separate components. The learner 81 corresponds to a "second learner" of the present disclosure. The predictor 82 corresponds to a "second predictor" of the present disclosure.

The learner 81 constructs a prediction model (learning model) that predicts the second NOx concentration based on the fourth operation data by performing machine learning using, as learning data, a data set of the fourth operation data obtained when the injection amount F of the reducing agent is controlled by the control system 3 according to the first embodiment and the measured values of the second NOx concentration. As described above, the fourth operation data is data related to the denitrification reaction in the denitrification device 31 obtained when the injection amount F of the reducing agent is controlled by the control system 3 according to the first embodiment.

In the following, for the purpose of preventing the explanation from becoming complicated, the prediction model (learning model) constructed by the learner 60 is referred to as a first prediction model, and the prediction model (learning model) constructed by the learner 81 is referred to as a second prediction model. That is, the prediction model (learning model) constructed by the learner 60 in the first embodiment corresponds to the first prediction model constructed by the learner 60 in the second embodiment.

As described above, the fourth operation data is data having a correlation or causal relationship with the second NOx concentration. Therefore, the learner 81 constructs the second prediction model by machine-learning, from the learning data, the relationship between the fourth operation data and the second NOx concentration. The second prediction model outputs the predicted value of the second NOx concentration when the fourth operation data is input. For example, the second prediction model is a so-called neural network.

The predictor 82 acquires, from the learner 81, the second prediction model (learned model) constructed by the learner 81. Then, the predictor 82 predicts the second NOx concentration based on the fourth operation data which is not the learning data, by the second prediction model (learned model). Specifically, the predictor 82 inputs data including the fourth operation data at the predetermined time point t1 to the learned model and predicts the second NOx concentration at time point t2 (t2=t1+Δt) after the predetermined period of time Δt has elapsed from the predetermined time point t.

The predictor 82 outputs the predicted value of the predicted second NOx concentration to the control device 90.

The control device 90 is an information processing device such as a computer. For example, the control device 90 may include a microprocessor such as a CPU or an MPU, a microcontroller such as an MCU, a memory such as a Random Access Memory (RAM) or a Read Only Memory (ROM), a storage such as a Hard Disk Drive (HDD) or a Solid State Drive (SSD), and an input/output interface.

Figure 7:
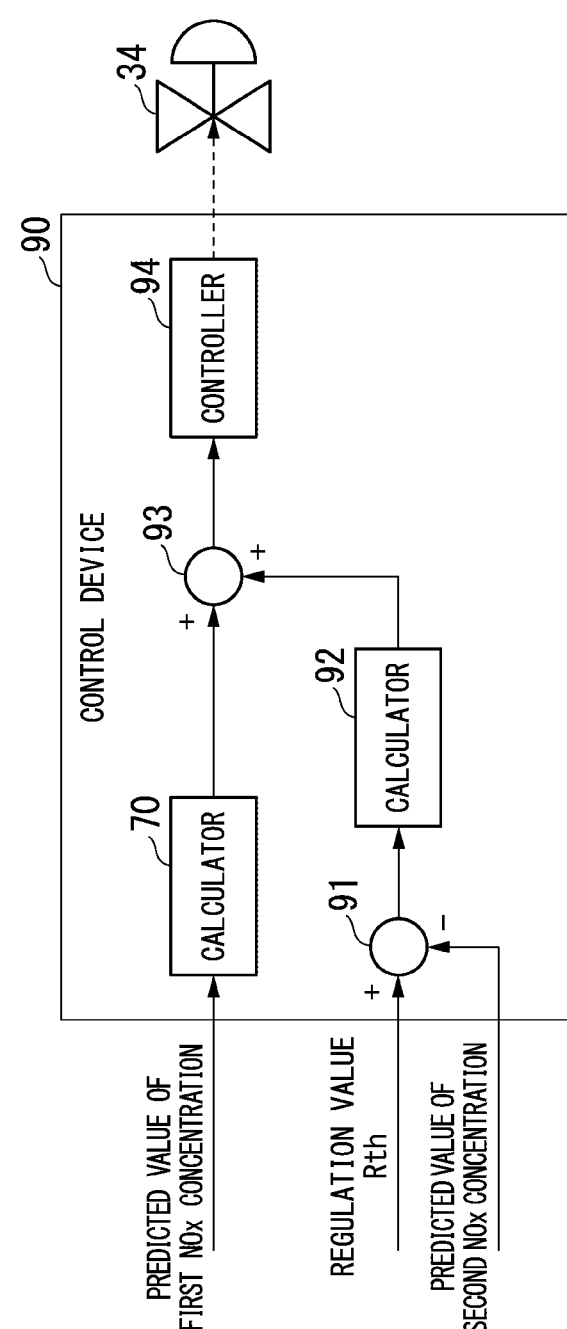
FIG. 7 is a schematic configuration diagram of a control device 90 according to the second embodiment.

Hereinafter, the configuration of the control device 90 according to the second embodiment will be described with reference to FIG. 7. FIG. 7 is a schematic configuration diagram of the control device 90 according to the second embodiment.

As illustrated in FIG. 7, the control device 90 includes a calculator 70 (first calculator), a subtractor 91, a calculator 92 (second calculator), an adder 93, and a controller 94.

As described in the first embodiment, when NOx having the same concentration as the predicted value of the first NOx concentration predicted by the predictor 61 is introduced into the denitrification device 31, the calculator 70 calculates a flow rate of reducing agent needed for the denitrification device 31 to denitrify NOx such that a concentration thereof is a regulation value Rth or lower. In the following, for the purpose of preventing the explanation from becoming complicated, the needed flow rate of the reducing agent calculated by the calculator 70 is referred to as a first needed flow rate. The regulation value Rth may be stored in advance in a storage (not illustrated) in the control device 90. Further, the control device 90 may receive the regulation value Rth from an external device.

The calculator 70 outputs the first needed flow rate to the adder 93.

The subtractor 91 calculates a difference value (hereinafter, referred to as "NOx difference") between the predicted value of the second NOx concentration predicted by the predictor 82 and the regulation value Rth. Then, the subtractor 91 outputs the calculated NOx difference to the calculator 92.

The calculator 92 calculates a second needed flow rate, which is the flow rate of the reducing agent needed for removing all of NOx of the NOx difference calculated by the subtractor 91. That is, the second needed flow rate is the flow rate of the reducing agent needed to denitrify all of the NOx in the denitrification device 31 when NOx having the same concentration as the NOx difference is introduced into the denitrification device 31.

A method for calculating the second needed flow rate in the calculator 92 is the same as the method for calculating the first needed flow rate in the calculator 70.

For example, the calculator 92 calculates the total amount of NOx in the exhaust gas based on the flow rate of the exhaust gas at the outlet of the coal economizer 24 and the NOx concentration (NOx difference) at the outlet of the coal economizer 24. The flow rate of the exhaust gas at the outlet of the coal economizer 24 may be a predicted value or a measured value. Subsequently, the calculator 92 calculates the molar ratio of the amount of reducing agent to the amount of NOx for satisfying the denitrification rate, based on the NOx concentration at the outlet of the coal economizer 24 when converted to an oxygen concentration of 6% and the set value (the regulation value Rth) of NOx at the outlet of the denitrification device 31. Then, the calculator 92 calculates the second needed flow rate of the reducing agent by multiplying the total amount of NOx by the molar ratio.

The calculator 92 outputs the calculated second needed flow rate to the adder 93.

The adder 93 calculates a third needed flow rate by adding the first needed flow rate to the second needed flow rate. Then, the adder 93 outputs the third needed flow rate to the controller 94.

The controller 94 controls the injection amount F based on the third needed flow rate calculated by the adder 93. Specifically, the controller 94 controls the valve opening degree of the control valve 34 such that the injection amount F of the injector 40 is the third needed flow rate calculated by the adder 93.

Next, the operation flow of the control system 3B according to the second embodiment will be described.

The prediction device 50 inputs data including the first operation data at a predetermined time point t1 to the first prediction model (learned model) and predicts the first NOx concentration at time point t2 (t2=t1+Δt) after the predetermined period of time Δt has elapsed from the predetermined time point t. The prediction device 50 outputs the predicted value of the predicted first NOx concentration at time point t2 to the control device 90.

The prediction device 80 predicts the second NOx concentration at time point t2 by inputting data including the fourth operation data at the predetermined time point t1 to the second prediction model (learned model). The data including the fourth operation data at the predetermined time point t1 may include the fourth operation data at the predetermined time point t1, and may further include the fourth operation data at a time point before the predetermined time point t1.

Here, the second prediction model is a learning model constructed by machine-learning the relationship between the measured values of the fourth operation data and the measured values of the second NOx concentration. The learning data used in the construction of the second prediction model is a data set of the fourth operation data and the measured values of the second NOx concentration obtained when the injection amount F is controlled by the control system 3 of the first embodiment. That is, the learning data of the second prediction model is the data set of the fourth operation data and the measured values of the second NOx concentration obtained when the function of the calculator 92 is invalidated and the first needed flow rate calculated by the calculator 70 is output to the controller 94 as the third needed flow rate.

The prediction device 80 outputs the predicted value of the predicted second NOx concentration at time point t2 to the control device 90.

The control device 90 obtains the first needed flow rate of the reducing agent at time point t2 based on the predicted value of the first NOx concentration at time point t2. Further, the control device 90 obtains the NOx difference which is the difference between the regulation value Rth and the predicted value of the second NOx concentration, and obtains the second needed flow rate from the NOx difference. Then, the control device 90 adds the first needed flow rate and the second needed flow rate to obtain the third needed flow rate and controls the valve opening degree of the control valve 34 such that the injection amount F of the injector 40 is the third needed flow rate.

As described above, the control system 3B according to the second embodiment predicts the first NOx concentration based on the first operation data including the second operation data and the third operation data and controls the injection amount F of the reducing agent based on the predicted value.

With such a configuration, the control system 3B can predict the first NOx concentration in consideration of the operation conditions of the coal pulverizer 12, which is a factor that varies the flow rate of the exhaust gas, and can appropriately control the injection amount F of the reducing agent.

Further, the control device 90 of the control system 3B obtains a needed flow rate, which is a flow rate needed for denitrification, from the predicted value of the first NOx concentration and controls the injection amount F according to the needed flow rate. At this time, the control system 3B predicts the second NOx concentration, based on the fourth operation data related to the denitrification reaction in the denitrification reactor 41, and corrects the needed flow rate based on the NOx difference which is the difference between the predicted value and the regulation value Rth.

With such a configuration, the control system 3B according to the second embodiment can control the injection amount F more appropriately as compared with the first embodiment.

Although the embodiments of the present invention have been described in detail with reference to the drawings, the specific configuration is not limited to this embodiment, and includes designs and the like within a scope of the present invention.

For example, in the first and second embodiments described above, the coal types of coal stored in the respective coal bunkers 10 (10-1 to 10-$n$) of the pulverized coal supply devices 4-1 to 4-$n$ are different. However, some or all of the coal types may be the same.

Modification Example 1

The first embodiment and the second embodiment have been described for a case where the second operation data is the primary air flow rate and the drive current of the primary air fan as an example, but the second operation data is not limited thereto. The second operation data may be data indicating the operation conditions of the coal pulverizers 12-1 to 12-$n$, and may be the damper opening of the coal pulverizers 12-1 to 12-$n$, the primary air temperature, the primary air pressure, the lower chamber pressure, the upper chamber pressure, the mill differential pressure (pressure difference between the inlet and the inside of the coal pulverizer 12), the outer temperature, the rotary separator speed, and the like. The second operation data includes the identification information of the coal pulverizers 12-1 to 12-$n$, and the identification information of the coal pulverizers 12-1 to 12-$n$ and the operation conditions of the coal pulverizers 12-1 to 12-$n$ to may be associated with each other.

Modification Example 2

In the first embodiment and the second embodiment, the first operation data may include the data (a) and (b) described below. As a result, when predicting the first NOx concentration, it becomes possible to take not only the variation of the fuel NOx but also the variation of the thermal NOx into consideration, and the prediction accuracy of the first NOx concentration is improved.

(a) data of the reaction temperature of the denitrification reactor 41 and the combustion temperature of the coal-fired boiler 5 (for example, outlet temperature of each superheater 22 and spray flow rate of each superheater 22)

(b) data of $O_2$ concentration (for example, $O_2$ concentration at the outlet of each coal economizer 24)

Modification Example 3

In the first embodiment and the second embodiment, the first operation data may include information on the air ratio. The air ratio is (the amount of air actually put into the coal-fired boiler 5)/(the minimum amount of air needed for fuel combustion (theoretical air amount)).

Modification Example 4

Figure 8:
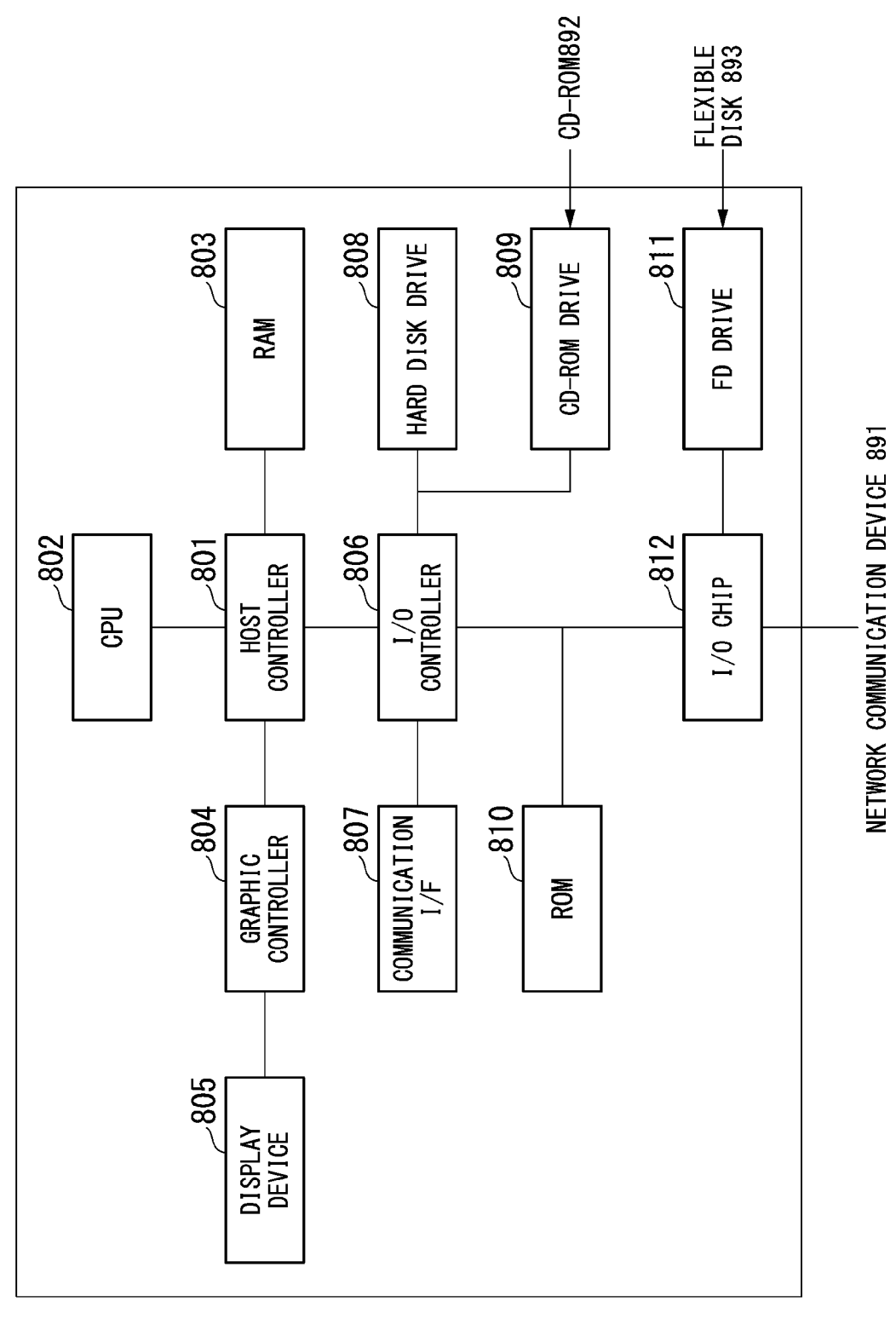
FIG. 8 is a diagram illustrating an example of a hardware configuration when the prediction device 50 and the prediction device 80 are configured with an information processing device such as a computer.

FIG. 8 is a diagram illustrating an example of a hardware configuration when the prediction device 50 and the prediction device 80 are configured with an information processing device such as a computer. The prediction device 50 and the prediction device 80 include a Central Processing Unit (CPU) peripheral portion, an inputter/outputter, and a legacy inputter/outputter. The CPU peripheral portion includes a CPU 802, a Random Access Memory (RAM) 803, a graphic controller 804, and a display device 805 that are interconnected by a host controller 801. The inputter/outputter includes a communication interface 807, a hard disk drive 808, and a Compact Disk Read Only Memory (CD-ROM) drive 809 connected to the host controller 801 by an input/output controller 806. The legacy inputter/outputter includes a Read Only Memory (ROM) 810, a flexible disk drive 811 and an input/output chip 812 connected to the input/output controller 806.

The host controller 801 connects the RAM 803 to the CPU 802 that accesses the RAM 803 at a high transfer rate, and the graphic controller 804. The CPU 802 operates based on the programs stored in the ROM 810 and the RAM 803 to control each unit. The graphic controller 804 acquires image data generated on a frame buffer provided in the RAM 803 by the CPU 802 and the like, and displays the image data on the display device 805. Instead, the graphic controller 804 may include a frame buffer for storing image data generated by the CPU 802 or the like therein.

The input/output controller 806 connects the host controller 801 to the hard disk drive 808, the communication interface 807, and the CD-ROM drive 809, which are relatively high-speed input/output devices. The hard disk drive 808 stores programs and data used by the CPU 802. The communication interface 807 connects to a network communication device 891 to transmit and receive programs or data. The CD-ROM drive 809 reads a program or data from the CD-ROM 892 and provides the same to the hard disk drive 808 and the communication interface 807 via the RAM 803.

The input/output controller 806 is connected to the ROM 810, and the flexible disk drive 811 and the input/output chip 812 which are relatively low speed input/output devices. The ROM 810 stores a boot program executed by the prediction device 50 and the prediction device 80 at startup, a program that depends on the hardware of the prediction device 50 and the prediction device 80, and the like. The flexible disk drive 811 reads a program or data from the flexible disk 893 and provides the same to the hard disk drive 808 and the communication interface 807 via the RAM 803. The input/output chip 812 connects various input/output devices via the flexible disk drive 811 or a parallel port, a serial port, a keyboard port, a mouse port, and the like.

The program executed by the CPU 802 is stored in a recording medium such as the flexible disk 893, the CD-ROM 892, or an integrated circuit (IC) card and provided by the user. The program stored in the recording medium may be compressed or uncompressed. The program is installed in the hard disk drive 808 from the recording medium, read into the RAM 803, and executed by the CPU 802. The program executed by the CPU 802 causes the prediction device 50 to function as the learner 60 and the predictor 61 described in relation to FIGS. 1 to 8, and causes the prediction device 80 to function as the learner 81 and the predictor 82 described in relation to FIGS. 1 to 8.

The program illustrated above may be stored in an external storage medium. As the storage medium, in addition to the flexible disk 893 and the CD-ROM 892, an optical recording medium such as a Digital Versatile Disk (DVD) or Phase Disk (PD), a magneto-optical recording medium such as a MiniDisc (MD), a tape medium, a semiconductor memory such as an IC card and the like can be used. Further, a storage medium such as a hard disk or RAM provided in a server system connected to a dedicated communication network or the Internet may be used as a recording medium and provided as a program via the network.

INDUSTRIAL APPLICABILITY

The present disclosure can be used in a control system capable of appropriately controlling the injection amount of the reducing agent to the exhaust gas.

The invention claimed is:

1. An exhaust gas treatment facility for treating exhaust gas discharged from a coal-fired boiler in a thermal power generation facility, the exhaust gas treatment facility comprising:
   a control valve controlling an injection amount of a reducing agent to be injected into exhaust gas flowing from the coal-fired boiler toward a denitrification reactor of a denitrification device; and
   a control system controlling a valve opening degree of the control valve,
   wherein the control system includes:
      a first predictor, based on a first operation data which is operation data of the thermal power generation facility at a first time point, predicting a first concentration, which is a concentration of nitrogen oxides in the exhaust gas flowing from the coal-fired boiler toward the denitrification reactor at a second time point after a predetermined period of time from the first operation data;
      a first calculator calculating a first needed flow rate which is a flow rate of the reducing agent at the second time point, needed to denitrify the nitrogen oxides such that a concentration of the nitrogen oxides is a target value or lower when the nitrogen oxides with the first concentration predicted by the first predictor are introduced into the denitrification device, and
      a controller controlling the valve opening degree of the control valve such that the injection amount at the second time point is based on a predicted value of the first concentration predicted by the first predictor and the first needed flow rate calculated by the first calculator,
      wherein the first operation data includes at least either one of a second operation data and a third operation data, the second operation data being operation data at the first time point of one or more coal pulverizers provided in the thermal power generation facility, and the third operation data being operation data at the first time point of the coal-fired boiler affected by variation in operation conditions of the one or more coal pulverizers.

2. The exhaust gas treatment facility according to claim 1, wherein
   the thermal power generation facility includes a plurality of the coal pulverizers, and
   the second operation data includes data indicating operation conditions of each of the plurality of the coal pulverizers.

3. The exhaust gas treatment facility according to claim 2, wherein
   the second operation data further includes supply amounts of coal supplied to the plurality of coal pulverizers and coal types of the coal supplied to the plurality of coal pulverizers.

4. The exhaust gas treatment facility according to claim 1, wherein the control system further includes:
   a first learner constructing a prediction model that outputs the predicted value of the first concentration, by performing machine learning using, as learning data, a data set of the first operation data and measured values of the first concentration obtained in past operations, wherein
   the first predictor inputs data including the first operation data at a predetermined time point to the prediction model constructed by the first learner and predicts the first concentration after a predetermined period of time has elapsed from the predetermined time point.

5. The exhaust gas treatment facility according to claim 1, wherein the control system further includes:
   a second predictor predicting a second concentration, which is a concentration of nitrogen oxides in the exhaust gas having passed through the denitrification reactor, based on a fourth operation data related to a denitrification reaction in the denitrification reactor;
   a subtractor calculating a difference value between a predicted value of the second concentration and the target value;
   a second calculator calculating a second needed flow rate which is a flow rate of the reducing agent needed for the denitrification device to denitrify all of the nitrogen oxides of the difference value calculated by the subtractor; and
   an adder calculating a third needed flow rate by adding the first needed flow rate and the second needed flow rate, and
   wherein the controller controls the valve opening degree of the control valve such that the injection amount is based on the third needed flow rate calculated by the adder, instead of the first needed flow rate.

6. The exhaust gas treatment facility according to claim 5, wherein the control system further includes:
   a second learner constructing a second prediction model that outputs a predicted value of the second concentration, by performing machine learning using, as learning data, a data set of the fourth operation data and measured values of the second concentration obtained in past operations, wherein
   the second predictor inputs data including the fourth operation data at a predetermined time point to the second prediction model constructed by the second learner and predicts the second concentration after a predetermined period of time has elapsed from the predetermined time point.

* * * * *